(12) United States Patent
Seuss et al.

(10) Patent No.: US 11,544,306 B2
(45) Date of Patent: Jan. 3, 2023

(54) SYSTEM AND METHOD FOR CONCEPT-BASED SEARCH SUMMARIES

(71) Applicant: NORTHERN LIGHT GROUP, LLC, Boston, MA (US)

(72) Inventors: C. David Seuss, Charlestown, MA (US); Anton Voskresenskiy, Santa Barbara, CA (US)

(73) Assignee: NORTHERN LIGHT GROUP, LLC, Boston, MA (US)

( * ) Notice: Subject to any disclaimer, the term of this patent is extended or adjusted under 35 U.S.C. 154(b) by 734 days.

(21) Appl. No.: 14/861,530

(22) Filed: Sep. 22, 2015

(65) Prior Publication Data

US 2017/0083614 A1 Mar. 23, 2017

(51) Int. Cl.
*G06F 16/33* (2019.01)
*G06F 16/34* (2019.01)
*G06F 16/93* (2019.01)
*G06F 16/951* (2019.01)

(52) U.S. Cl.
CPC .......... *G06F 16/334* (2019.01); *G06F 16/345* (2019.01); *G06F 16/93* (2019.01); *G06F 16/951* (2019.01)

(58) Field of Classification Search
CPC ........ G06F 17/30675; G06F 17/30011; G06F 17/30637; G06F 17/30657; G06F 17/30719; G06F 17/30867
See application file for complete search history.

(56) References Cited

U.S. PATENT DOCUMENTS

| | | | |
|---|---|---|---|
| 4,073,691 A | 2/1978 | Ahnell et al. | |
| 5,907,841 A | 5/1999 | Sumita et al. | |
| 5,920,854 A * | 7/1999 | Kirsch | G06Q 50/22 |
| 5,924,090 A | 7/1999 | Krellenstein | |
| 6,038,560 A | 3/2000 | Wical | |

(Continued)

FOREIGN PATENT DOCUMENTS

WO 2014183108 A1 11/2014

OTHER PUBLICATIONS

Fang Liu; Effective Keyword Search in Relational Databases; SIGMOD; 2006; p. 563-574 (Year: 2006).*

(Continued)

*Primary Examiner* — Amresh Singh
*Assistant Examiner* — Jermaine A Mincey
(74) *Attorney, Agent, or Firm* — Lando & Anastasi, LLP

(57) ABSTRACT

Systems and methods for generating concept-based search summaries from a plurality of documents are provided. In one embodiment, a system may include interfaces to receive information identifying a meaning taxonomy including a normalized term and a search query including search terms. The system may be configured to identify documents relating to the search terms and normalized terms and display a concept-based summary of the documents, the summary including a syntactic structure associated with the normalized terms and search terms. In another embodiment, a method includes receiving a meaning taxonomy including normalized terms and search terms, identifying at least one document including the search terms and syntactic structures associated with the normalized terms, and display a search summary including the search terms and syntactic structures.

20 Claims, 8 Drawing Sheets

(56) References Cited

U.S. PATENT DOCUMENTS

| | | | |
|---|---|---|---|
| 6,134,553 A | 10/2000 | Jacobson et al. | |
| 6,295,529 B1 | 9/2001 | Corston-Oliver et al. | |
| 6,349,307 B1 | 2/2002 | Chen | |
| 6,549,897 B1 | 4/2003 | Katariya et al. | |
| 6,606,620 B1 | 8/2003 | Sundaresan et al. | |
| 6,789,230 B2 | 9/2004 | Katariya et al. | |
| 6,901,399 B1 | 5/2005 | Corston et al. | |
| 6,901,402 B1 | 5/2005 | Corston-Oliver et al. | |
| 7,117,207 B1* | 10/2006 | Kerschberg | G06F 17/30702 |
| 7,139,752 B2 | 11/2006 | Broder et al. | |
| 7,146,361 B2 | 12/2006 | Broder et al. | |
| 7,188,106 B2 | 3/2007 | Dwork et al. | |
| 7,231,612 B1 | 6/2007 | Mani et al. | |
| 7,269,594 B2 | 9/2007 | Corston-Oliver et al. | |
| 7,286,130 B2 | 10/2007 | Iguchi et al. | |
| 7,415,462 B2* | 8/2008 | Bradford | G06F 40/30 |
| 7,827,125 B1 | 11/2010 | Rennison | |
| 7,877,344 B2* | 1/2011 | Seuss | G06N 5/022 |
| | | | 706/47 |
| 7,962,489 B1 | 6/2011 | Chiang et al. | |
| 7,996,210 B2 | 8/2011 | Godbole et al. | |
| 8,117,223 B2 | 2/2012 | Patterson | |
| 8,245,135 B2 | 8/2012 | Cai et al. | |
| 8,271,266 B2 | 9/2012 | Gallagher et al. | |
| 8,276,065 B2 | 9/2012 | Huang et al. | |
| 8,340,957 B2 | 12/2012 | Gallagher et al. | |
| 8,407,215 B2 | 3/2013 | Sheedy et al. | |
| 8,583,580 B2* | 11/2013 | Seuss | G06N 5/022 |
| | | | 706/47 |
| 8,838,633 B2 | 9/2014 | Dhillon et al. | |
| 9,015,167 B1 | 4/2015 | Ballou et al. | |
| 9,323,767 B2 | 4/2016 | Blanchflower et al. | |
| 9,397,974 B1 | 7/2016 | Gross et al. | |
| 9,411,860 B2 | 8/2016 | Castellanos et al. | |
| 9,575,961 B2 | 2/2017 | Seuss | |
| 10,380,252 B2 | 8/2019 | Seuss | |
| 2002/0099700 A1 | 7/2002 | Li | |
| 2002/0103836 A1 | 8/2002 | Fein et al. | |
| 2002/0169771 A1 | 11/2002 | Melmon et al. | |
| 2002/0188587 A1* | 12/2002 | McGreevy | G06F 17/30666 |
| 2003/0078913 A1* | 4/2003 | McGreevy | G06F 17/30395 |
| 2003/0154071 A1 | 8/2003 | Shreve | |
| 2004/0059736 A1* | 3/2004 | Willse | G06F 17/27 |
| 2004/0107102 A1 | 6/2004 | Chung et al. | |
| 2004/0225667 A1 | 11/2004 | Hu et al. | |
| 2005/0060288 A1 | 3/2005 | von Groll | |
| 2005/0106126 A1 | 5/2005 | Whitlock | |
| 2005/0144159 A1 | 6/2005 | Baader et al. | |
| 2005/0203970 A1 | 9/2005 | McKeown et al. | |
| 2006/0004732 A1 | 1/2006 | Odom | |
| 2006/0010373 A1 | 1/2006 | Burns | |
| 2006/0202806 A1 | 9/2006 | Han et al. | |
| 2007/0016563 A1 | 1/2007 | Dmoigui | |
| 2008/0010268 A1* | 1/2008 | Liao | G06F 16/951 |
| 2008/0021925 A1 | 1/2008 | Sweeney | |
| 2008/0071519 A1 | 3/2008 | Brun et al. | |
| 2008/0195597 A1 | 8/2008 | Rosenfeld et al. | |
| 2008/0270380 A1* | 10/2008 | Ohm | G06F 17/30654 |
| 2008/0288442 A1 | 11/2008 | Feigenbaum et al. | |
| 2009/0006382 A1* | 1/2009 | Tunkelang | G06F 17/30657 |
| 2009/0099993 A1* | 4/2009 | Seuss | G06N 5/022 |
| | | | 706/47 |
| 2009/0157382 A1 | 6/2009 | Bar | |
| 2009/0313236 A1 | 12/2009 | Hernacki et al. | |
| 2010/0079464 A1 | 4/2010 | Matsumura | |
| 2010/0100543 A1 | 4/2010 | Brady | |
| 2010/0166918 A1 | 7/2010 | Miller | |
| 2011/0119271 A1* | 5/2011 | Seuss | G06N 5/022 |
| | | | 707/738 |
| 2011/0231416 A1 | 9/2011 | Goodchild Drake | |
| 2011/0252031 A1 | 10/2011 | Blumenthal et al. | |
| 2011/0289088 A1 | 11/2011 | Yarin et al. | |
| 2012/0095994 A1 | 4/2012 | Nagarajayya | |
| 2012/0215717 A1 | 8/2012 | Arnott et al. | |
| 2013/0021346 A1 | 1/2013 | Terman | |
| 2013/0046584 A1 | 2/2013 | Yu et al. | |
| 2013/0159340 A1 | 6/2013 | Blanco et al. | |
| 2013/0204876 A1 | 8/2013 | Szucs et al. | |
| 2014/0052672 A1 | 2/2014 | Wagner et al. | |
| 2014/0280121 A1* | 9/2014 | Sharp | G06F 17/3053 |
| | | | 707/732 |
| 2014/0372468 A1 | 12/2014 | Collins et al. | |
| 2015/0254230 A1* | 9/2015 | Papadopoullos | G06F 17/275 |
| | | | 704/8 |
| 2015/0278731 A1 | 10/2015 | Schwaber et al. | |
| 2016/0062986 A1 | 3/2016 | Seuss | |
| 2016/0062994 A1* | 3/2016 | Agarwal | G06F 17/30038 |
| | | | 715/205 |
| 2016/0162582 A1* | 6/2016 | Chatterjee | G06F 17/30867 |
| | | | 707/706 |
| 2016/0299881 A1 | 10/2016 | Gupta et al. | |
| 2016/0342572 A1* | 11/2016 | Paulin | G06F 17/30011 |
| 2016/0342590 A1* | 11/2016 | Paulin | G06F 17/30011 |
| 2017/0083614 A1* | 3/2017 | Seuss | G06F 16/334 |
| 2017/0161259 A1 | 6/2017 | Zhao | |
| 2017/0193072 A1 | 7/2017 | Vase et al. | |
| 2017/0300538 A1 | 10/2017 | Seuss | |
| 2017/0300752 A1 | 10/2017 | Biswas et al. | |
| 2017/0329841 A1* | 11/2017 | Holmes | G06F 40/242 |
| 2018/0032608 A1 | 2/2018 | Wu et al. | |
| 2018/0096061 A1 | 4/2018 | Seuss et al. | |
| 2018/0365323 A1 | 12/2018 | Doornenbal et al. | |
| 2019/0129942 A1 | 5/2019 | Seuss | |

OTHER PUBLICATIONS

Hans-Michael Muller et al., "Textpresso: An Ontology-Based Information Retrieval and Extraction System for Biological Literature", PLOS Biology, vol. 2, No. 11, p. 1984-1998, Sep. 21, 2004, XP055335131, DOI: 10.1371/journal.pbio.0020309.

European Search Report from European Application No. 16189693.1 dated Jan. 24, 2017.

Benjamin, Victor et al., "Evaluating text visualization: An experiment in authorship analysis", 2013 IEEE International Conference on Intelligence and Security Informatics, IEEE, Jun. 4, 2013, pp. 16-20.

Barik et al., "Placing Query Term Proximity in Search Context", International Conference on Machine Learning, Image Processing, Network Security and Data Sciences. Springer, Singapore, 2020.

Office Action from corresponding Australian Application No. 2016228246 dated Apr. 1, 2021.

* cited by examiner

SYSTEM AND METHOD FOR CONCEPT-BASED SEARCH SUMMARIES

BACKGROUND

Technical Field

Aspects of the present application relate to content analysis, and more specifically, to systems and methods for automated analysis of content.

Background Discussion

Search engines generally follow a common approach for presenting users with documents that may be responsive to a keyword search. These search engines receive key terms, parse documents for those key terms, and display documents that include those key terms. The displayed documents are usually ranked according to their perceived relevance and presented to a user. Conventional search engines typically display snippets of text from the relevant documents, with those snippets often including one or more of the searched key terms.

When parsing documents, typical search engines attempt to find the specific key term searched, as well as obvious variations of the key term. For example, if a user searches "pandas," a typical search engine might display results that include "panda" or "pandas." Search engines can search based on multiple key terms, and may display a search summary showing each of the key terms in different parts of a document. The key terms found in documents returned by the search may be out of context from one another, however, and some results may not relate to the user's intended search query.

SUMMARY

Embodiments of the present application provide a search engine that receives key terms and key concepts and presents search results including concept-based search summaries. Typical search engines do not provide search results that are accurate to both a key concept being searched and a key term. Aspects disclosed herein are drawn to a method and system for generating concept-based search summaries that include text snippets from documents relating to specific key concepts and key terms.

According to one aspect of the present invention, a system for generating concept-based search summaries from a plurality of documents is provided comprising a first input configured to receive information identifying a meaning taxonomy including a plurality of normalized terms, each normalized term of the plurality of normalized terms being associated with one or more syntactic structures, a second input configured to receive a search query including at least one term and at least one normalized term, a memory having storage capacity, and a controller coupled to the memory and the first and second inputs and configured to identify at least one document within the plurality of documents including the at least one term and at least one syntactic structure associated with the at least one normalized term of the plurality of normalized terms, and display at least one summary of the at least one document, the at least one summary including the at least one term and the at least one syntactic structure. According to one embodiment, each of the one or more syntactic structures comprises one or more words. According to another embodiment, the first input is further configured to receive a proximity requirement between the at least one term and the at least one syntactic structure and wherein the controller is configured to filter the at least one summary to summaries that fulfill the proximity requirement.

According to one embodiment, the at least one document comprises two or more documents and wherein the controller is further configured to sort the two or more documents by a number of occurrences of the one or more syntactic structures or by a relevance calculation based on the syntactic structures. According to one embodiment, the at least one summary includes at least one sentence from the at least one document including the at least one term and the at least one syntactic structure. According to another embodiment, the at least one meaning loaded entity includes two or more meaning loaded entity and wherein the at least one summary includes a plurality of syntactic structures associated with the two or more meaning loaded entities.

According to another aspect of the present invention, a computer-implemented method for generating concept-based search summaries from a plurality of documents is provided comprising receiving information identifying a meaning taxonomy including a plurality of meaning loaded entities, each meaning loaded entity of the plurality of meaning loaded entities being associated with one or more syntactic structures, receiving a search query including at least one term and identifying at least one meaning loaded entity of the plurality of meaning loaded entities, identifying at least one document within the plurality of documents including the at least one term and at least one syntactic structure associated with the at least one meaning loaded entity of the plurality of meaning loaded entities, and displaying at least one summary of the at least one document, the at least one summary including the at least one term and the at least one syntactic structure. According to one embodiment, receiving information identifying the meaning taxonomy comprises receiving information identifying at least one expert rule set. According to one embodiment, the system further comprises receiving information identifying a proximity requirement between the at least one term and the at least one syntactic structure and filtering search results to documents that fulfill the proximity requirement. According to yet another embodiment, the system further comprises sorting the at least one document by a number of instances that the at least one document includes the one or more syntactic structures or by other means such as a relevance calculation based in whole or in part on the syntactic structures, dates, etc.

According to one embodiment, displaying the at least one summary includes displaying at least one sentence from the at least one document including the at least one term and the at least one syntactic structure. According to one embodiment, receiving the search query identifying the at least one normalized term includes receiving the search query identifying two or more normalized terms and wherein displaying the at least one summary includes displaying a plurality of syntactic structures associated with the two or more meaning loaded entities. According to another embodiment, the system further comprises receiving information identifying a syntactic structure associated with the at least one normalized term and filtering out documents that include the syntactic structure.

According to another aspect of the present invention, a method is provided comprising a non-transitory computer readable medium having stored thereon sequences of instruction, the sequences of instruction including executable instructions that instruct at least one processor to receive information identifying a meaning taxonomy including a plurality of normalized terms, each normalized term of the plurality of normalized terms being associated with one or more syntactic structures, receive a search query including at least one term and identifying at least one normalized term of the plurality of normalized terms, identify at least one document within the plurality of documents including the at least one term and at least one syntactic structure associated with the at least one normalized term of the plurality of normalized terms, and display at least one summary of the at least one document, the at least one summary including the at least one term and the at least one syntactic structure. According to one embodiment, the sequences of instructions further comprise instructions that instruct the at least one processor to receive a proximity or other relational requirement between the at least one term and the at least one syntactic structure, and filter the at least one summary to summaries that fulfill the proximity requirement.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed subject matter. Particular references to examples and embodiments, such as "an embodiment," "an example," "another embodiment," "another example," "some embodiments," "some examples," "other embodiments," "an alternate embodiment," "various embodiments," "one embodiment," "at least one embodiments," "this and other embodiments" or the like, are not necessarily mutually exclusive and are intended to indicate that a particular feature, structure, or characteristic described in connection with the embodiment or example and may be included in that embodiment or example and other embodiments or examples. The appearances of such terms herein are not necessarily all referring to the same embodiment or example.

Furthermore, in the event of inconsistent usages of terms between this document and documents incorporated herein by reference, the term usage in the incorporated references is supplementary to that of this document; for irreconcilable inconsistencies, the term usage in this document controls. In addition, the accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
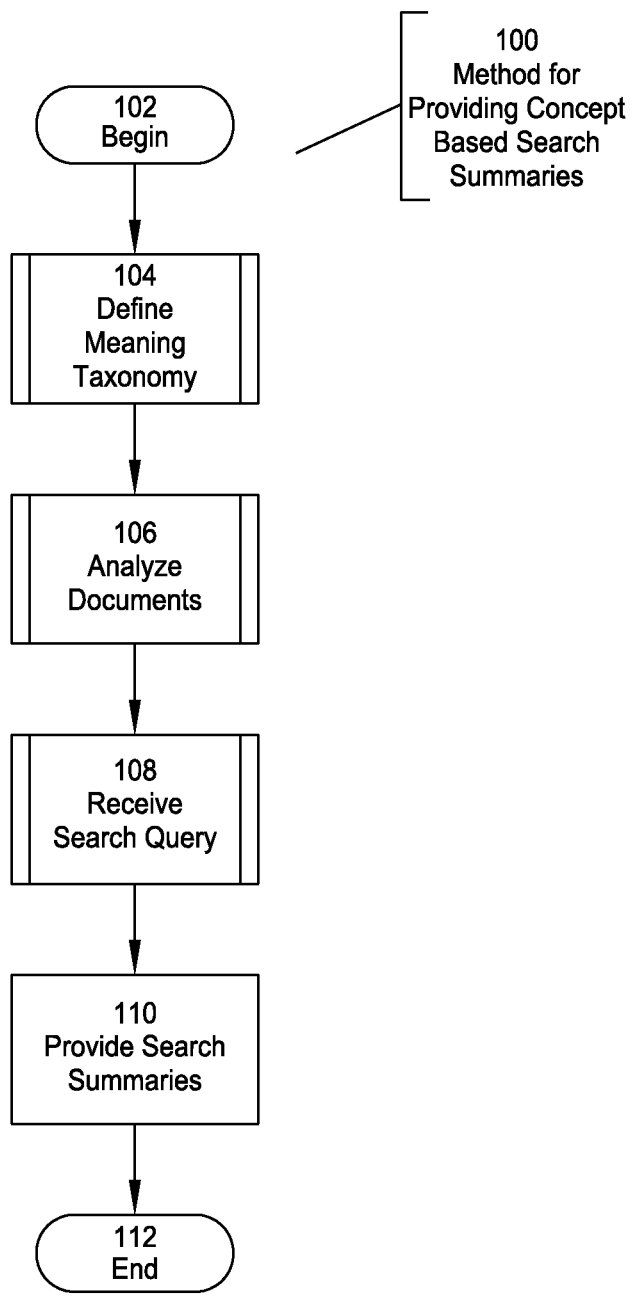
FIG. 1 is a flow chart of an example process for providing search results with concept based search summaries according to one embodiment.

Some embodiments disclosed herein include apparatus and processes that implement a search summary system that is configured to generate and display a search summary using content (e.g., text snippets) from a plurality of searched documents. The search summary system may extract content from the plurality of searched documents relating to received key terms and key concepts.

In some embodiments, the search summary system is further configured to summarize content from documents in a search to display content relevant to key terms that are received as well as key, often complex and/or specialized, concepts relating to an information domain being addressed by a search query. These key concepts may be referred to herein as meaning loaded entities or taxonomy elements. Some examples of meaning extraction tools and techniques are described in U.S. Pat. No. 7,877,344, titled "METHOD AND APPARATUS FOR EXTRACTING MEANING FROM DOCUMENTS USING A MEANING TAXONOMY COMPRISING SYNTACTIC STRUCTURES," issued Jan. 25, 2011, and U.S. Pat. No. 8,583,580, titled "METHOD AND APPARATUS FOR IDENTIFYING AND EXTRACTING MEANING IN DOCUMENTS," issued Nov. 12, 2013, each of which is hereby incorporated herein by reference in its entirety.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

One example of the present application includes a method for providing search summaries for documents relevant to a received search query. FIG. 1 illustrates a process flow diagram for providing concept-based search summaries. Process 100 includes defining a meaning taxonomy 104, analyzing documents 106, receiving a search query 108, and providing search summaries 110. Components of this process and its sub-processes may be implemented using, for example, a computer system as discussed with regard to FIG. 10 below.

More particularly, at block 102, process 100 begins. At block 104 an information domain expert may define one or more meaning taxonomies. For instance, the information domain expert may be any person who can perform expert analysis of subject matter within an information domain. In another embodiment, one or more meaning taxonomies may be imported from another information domain, or may be adapted from the meaning taxonomy of another information domain. In some embodiments, the meaning taxonomy may be defined by a fully- or semi-automated process using techniques such as machine learning, text mining, data mining, neural networks, text analysis, eDiscovery, sentiment analysis, natural language processing, semantic analysis and others.

The meaning taxonomy may serve as the basis for an analytical framework in accordance with one embodiment of the present application. The meaning taxonomy may include key concepts (represented by normalized terms), and may include meaning loaded entities. It will be appreciated that a meaning loaded entity in a particular context may be thought of as a key concept in that context. Meaning loaded entities and key concepts will therefore be collectively referred to herein as key concepts for ease of reference; references to meaning loaded entities herein are intended to encompass key concepts, and vice versa. The meaning taxonomy may define various non-normalized terms that, when present in a document, may indicate the document may be relevant to a key concept or meaning loaded entity.

Key concepts may be represented in the meaning taxonomy by a corresponding normalized term. The meaning taxonomy may further identify various syntactic structures that may be used to identify and normalize the non-normalized terms. Both normalized terms and non-normalized terms may therefore be associated with key concepts.

The meaning taxonomy may include multiple layers of syntactic structures and associated key concepts in various ways. For example, in one embodiment, these layers may be hierarchical in nature. Further, the key concepts may be positioned at various locations within the meaning taxonomy based on the information domain the meaning taxonomy belongs in. A domain expert of a search summary system, as described in FIG. 5 and the accompanying description, may build, define, and/or constrain the structure of the meaning taxonomy. The specific configuration of any meaning taxonomy may depend upon the information domain being analyzed and the key concepts that the information domain expert uses for automatic analysis and/or categorization.

Figure 2:
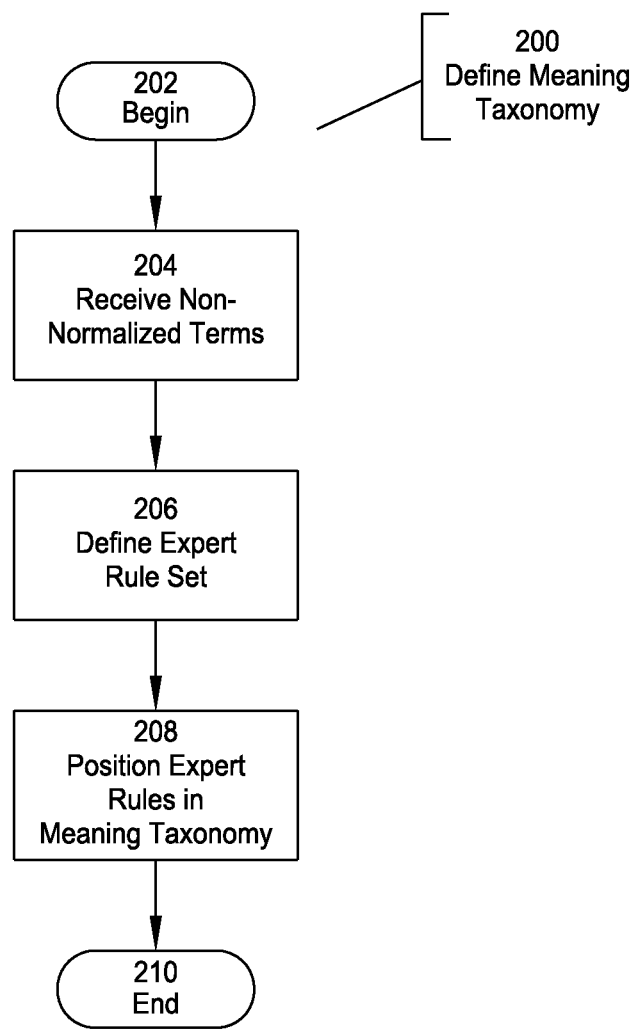
FIG. 2 is a flow chart of an example process for defining a meaning taxonomy according to one embodiment.

FIG. 2 illustrates an exemplary process for defining a meaning taxonomy. At block 202, process 200 begins. At block 204, the information domain expert inserts one or more non-normalized terms in the meaning taxonomy. These non-normalized terms may serve as the basis for evaluating documents for relevancy during document analysis.

At block 206, the information domain expert may define an expert rule set. In particular, the expert rule set may include rules associating normalized terms (which may be used to represent key concepts) and non-normalized terms in a document. For example, the expert rule set may require the presence of one or more non-normalized terms in a document for the document to evaluate true for the corresponding key concept. As another example, the expert rule set may include proximity requirements between non-normalized terms. In such embodiments, the document will evaluate true for the key concept only if certain non-normalized terms appear within a certain proximity of one another; the desired proximity may be configurable by the information domain expert or others.

Additional types of rules may be included in the expert rule set to indicate the present of a key concept. In some embodiments, case-sensitive terms may be specified. For example, a rule may specify that "GM" indicates the presence of the key concept "General Motors," whereas "gm" does not. In some embodiments, a rule may specify that a term present anywhere in a document be used to disambiguate the context of the term. For example, the term "car" or "truck" appearing anywhere in a document may indicate that the document is about the automotive industry. Such disambiguation may also be performed with exclusionary terms. For example, the term "genetically modified" appearing anywhere in the document may indicate that the document does not relate to General Motors or the automotive industry even though "GM" appears in the document.

Rules in the expert rule set may be combined into complex rules that inherit criteria from other syntactical structures. The following examples in Table 1 illustrate how earlier-defined rules may be incorporated into later rules, with normalized terms appearing in later-defined non-normalized terms enclosed in brackets:

TABLE 1

| Non-Normalized Term | Key Concept/ Normalized Term |
| --- | --- |
| "GM" and ("auto" or "truck") | Company: GM |
| "Ford" and ("auto" or "truck") | Company: Ford |
| ([Company: GM] near: 20 ("losing" near: 5 "share")) near: 10 [Company: Ford] | GM losing market share to Ford |

In still another embodiment, a proximity operator may be used that will evaluate as true if a key concept or non-normalized term appears within a configurable proximity from another concept or non-normalized term.

A non-limiting list of the logical operators that may be used in the expert rules includes "and", "or", and "not." In some embodiments, comparison operators, such as "<", ">" and "=" may be used. In some embodiments, wildcards may be used for matching one or several characters (e.g., "*" or "?"). In still another embodiment, lowercase and uppercase letters may be specified, or alternatively, expert rules may not distinguish between lowercase and uppercase letters.

At block 208, the normalized terms and associated non-normalized terms, and the relationship between them as expressed by the expert rules, may be positioned within the meaning taxonomy. The elements of the meaning taxonomy may be arranged into any interconnect graph structure or other arrangement or hierarchy. In one embodiment, for example, the meaning taxonomy may take the form of a hierarchical tree with normalized terms being positioned as leaf nodes within the tree structure.

In still another embodiment, a proximity operator (e.g., "near:n") may be used that will evaluate as true if a key concept or non-normalized term appears within a configurable proximity n from another concept or non-normalized term. In some embodiments, a frequency operator may evaluate as true if a particular key concept or non-normalized term appears a certain number of times within a configurable span or section of a document.

At block 210, process 200 ends.

Table 2 shows an example meaning taxonomy for business management and corporate-structure related concepts:

TABLE 2

| Non-normalized term | Key Concept/ Normalized Term | Position in Meaning Taxonomy |
|---|---|---|
| Announc* near: 5 partner* | Business Partnerships | Business Partnerships |
| Formed a partnership with | Business Partnerships | Business Partnerships |
| strategic near: 1 partner* | Strategic Partnerships | Business Partnerships |
| Close follower | Close Follower | Corporate Strategy |
| ahead of the market | Innovation | Corporate Strategy |
| innovati* | Innovation | Corporate Strategy |
| new breed | Innovation | Corporate Strategy |
| controls the market | Market Leadership | Corporate Strategy |
| industry leader | Market Leadership | Corporate Strategy |
| Leading the market | Market Leadership | Corporate Strategy |
| Market control | Market Leadership | Corporate Strategy |
| Market near: 2 lead* | Market Leadership | Corporate Strategy |
| Leading technology | Technology Leadership | Corporate Strategy |
| merg* or acquisition | Acquisitions | Corporate Strategy |

Table 2 is provided for illustrative purposes, and the arrangement of the taxonomy may vary from that shown without departing from the scope of the present embodiments disclosed herein. For example, in one embodiment, normalized terms may be associated with other normalized terms in a flat and/or hierarchical fashion. In another embodiment, non-normalized terms may be associated directly with normalized terms in a parent-child relationship. Other structures for storing normalized terms and non-normalized terms may be used. Thus, the logical structure of the meaning taxonomy may be tailored according to the characteristics of the information domain, thereby increasing the ease of creating and maintaining the meaning taxonomy.

Figure 3:
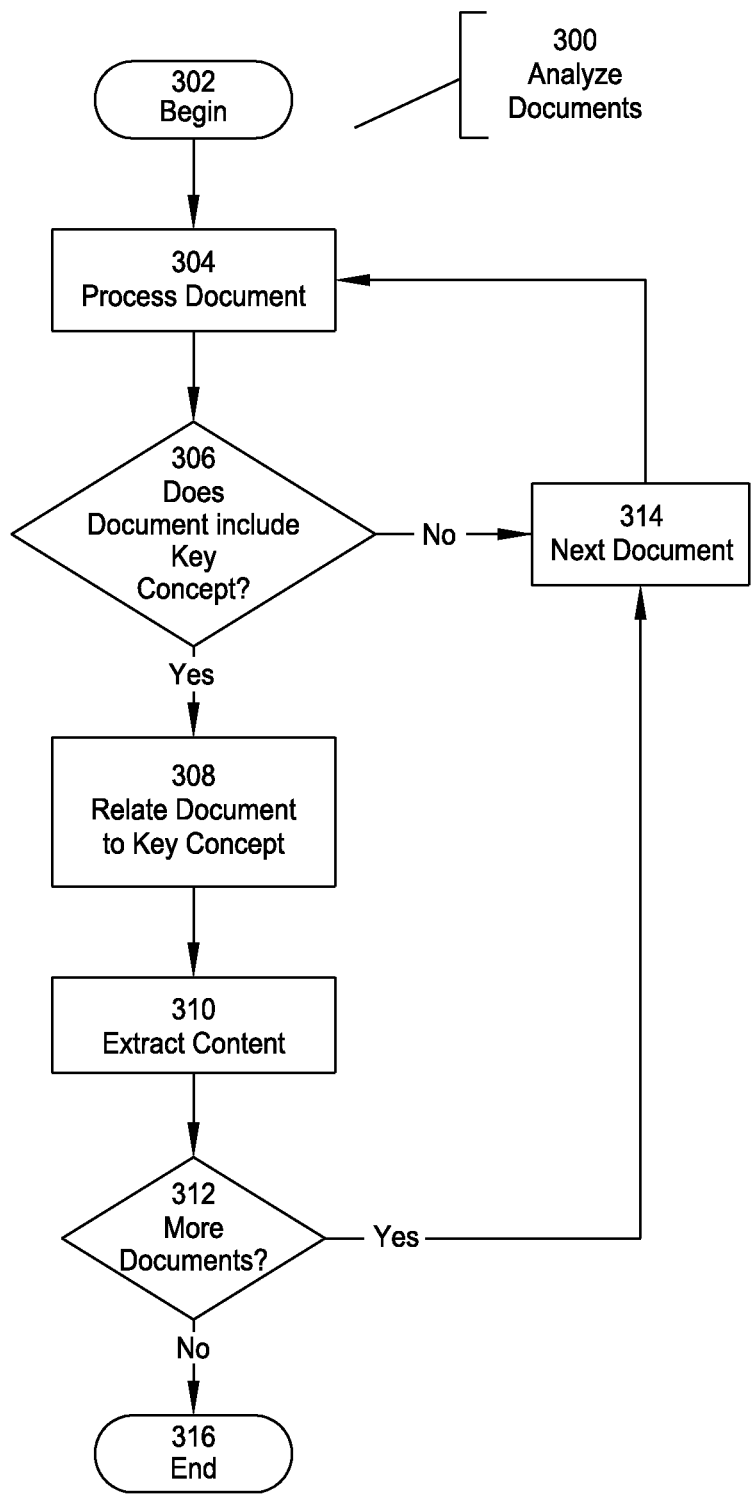
FIG. 3 is a flow chart of an example process of analyzing documents according to one embodiment.

Returning now to FIG. 1, at block 106, the search summary system processes and analyzes the content that is searched. The content may be in the form of documents, web pages, or any other collection of text. FIG. 3 presents a detailed view of one embodiment of this process. At block 302, process 300 begins. At block 304, the search summary system may process a document, which may include loading the content into a memory that is accessible by the system. Metadata, including the title, publisher, publication date, and other such information may also be extracted.

At block 306, the system determines if a document contains one or more key concepts, as represented by the received normalized terms. In particular, the system parses the content to identify any received non-normalized terms that were associated with one or more normalized terms in block 104.

If the document does not include any received non-normalized terms, the process proceeds to block 314, and the next document is processed at block 304.

At block 308, in response to the document including one or more received non-normalized terms, the system may relate relevant documents to the corresponding key concepts in the meaning taxonomy. This relation may be determined using the results of the document processing block 304 and a text analytics database or search index containing text analytics information. Documents may be related with specific key concepts based on the documents' inclusion of one or more non-normalized terms. In some embodiments, the location within the content that contains a non-normalized term may also be stored or associated with the key concept. For example, the character count, word count, page/line number, or other document location identifier may be stored.

In some embodiments, the system may be configured to assign a "weight," or importance, to documents containing content based on their perceived relevance or important in relation to other documents. In some embodiments, documents will be assigned a higher importance in proportion to the number of instances of non-normalized terms in the document. In other embodiments, importance may be based on the proximity of non-normalized terms or concepts to one another in the document.

If the document does not include any key concepts, the process proceeds to block 314, and the next document is processed at block 304.

At block 310, after or simultaneous with detecting received non-normalized terms in the content, the system may identify and extract some or all of the content of the document. A document database may store a portion or the entirety of documents in one or more relational database tables or other structures. If the document includes any key concepts, the location of the concept in the document is stored in the search index. The location of syntactic structures corresponding to non-normalized terms may be determined, and that location may be stored in a search index as an identifier that a discussion or reference to a key concept is present at that location in the document. The location of every word, phrase, multimedia element, or other element of the document may also be stored in the search index. Other metadata information such as the character count, word count, page/line number, or other document location identifier may also be stored. The search index may be combined with or, alternately, stored separately from, the document database.

At block 312, the search summary system detects if any more documents are queued. If another document is queued, the search summary system moves to the next document at block 314 and process 300 restarts for the new document at block 304. If there are no more documents to search, the process 300 proceeds to block 316. At block 314, process 300 ends.

Figure 4:
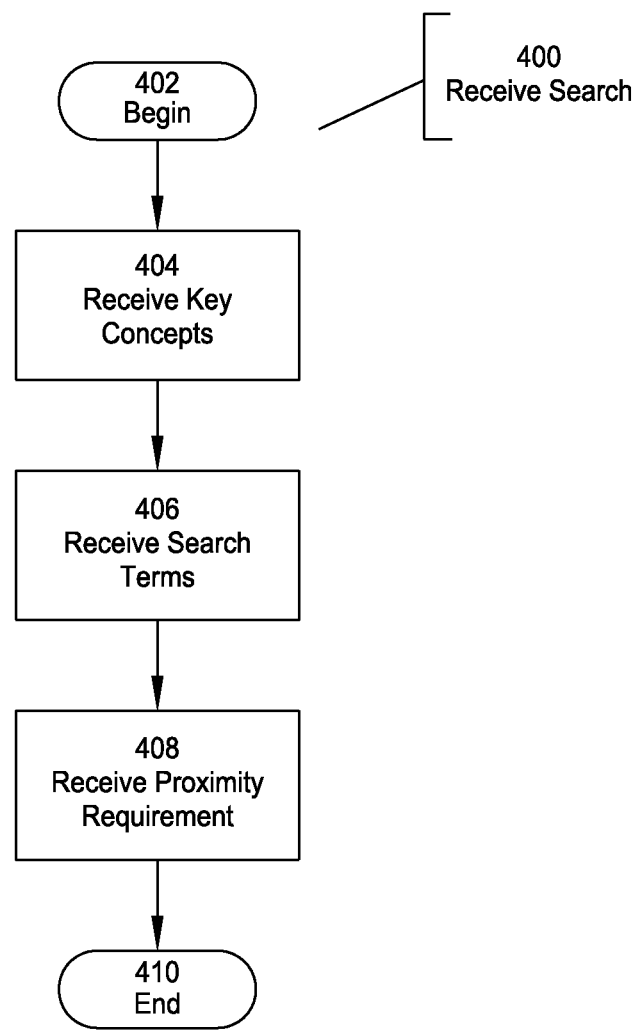
FIG. 4 is a flow chart of an example process for receiving a search according to one embodiment.

Returning now to FIG. 1, at block 106, the search summary system receives a search query containing key concepts, and, optionally, additional search terms. FIG. 4 presents a detailed view of an embodiment of this process. At block 402, process 400 begins. At block 404, the system may receive, from a user, a search query specifying one or more key concepts. In some embodiments, the key concepts may be received via a free-form user interface element, such as a text box. In other embodiments, the key concepts may be chosen from a list of preset key concepts.

At optional block 406, the system may receive, from the user, one or more search terms to be used in a search in addition to the key concept. In some embodiments, the key concepts and any search terms may be received via a user interface element, such as a text box.

At optional block 408, the system may receive a proximity requirement between one or more search terms and one or more key concepts. The search summary system may, for example, receive a requirement for a search term to be in the same sentence or paragraph as a key concept, or within a specified distance of a key concept. For example, if a user wants to limit a search to documents that mention the market growth of XYZ Co., the user can input "XYZ" as the search term, "Market Growth" as the key concept, and may require that the terms appear within the same sentence. In response, the search summary system may display information about a document (e.g., title, URL, author, etc.) along with a search summary, which may display a sentence such as "According to analysts, the client market for XYZ Co. will grow by 14% in 2015."

In some embodiments, the system may receive a search query containing more than one key concept and a proximity requirement. For example, the user may enter a search for the key concept of Business Partnerships appearing in the same sentence as the key concept of Technology Corporations. In response, the system may return documents previously identified as containing non-normalized terms relating to business partnerships in the same sentence as other non-normalized terms relating to specific technology corporations. Such a search might return documents containing sentences like "Amazon announced a distribution partnership with Microsoft," "Accenture and IBM strike a deal to develop hybrid cloud technology," or "EMC seeking financial partner for new venture."

At block 410, process 400 ends.

Returning now to FIG. 1, at block 110 the system may provide search results including key concept-based search summaries in response to a search query. For example, documents associated with a particular normalized term in block 308 may be identified in response to a search query involving that key concept. If the search query contains both a key concept and one or more search terms, documents containing the key concept and one or more of the search terms may be identified. The search results include extracted sections of documents that are relevant to the key concepts and any search terms that are the focus of the search, and may also include metadata such as document titles, document links, authorship or publication information, or the like. In one embodiment, a document listing includes a search summary with snippets of text relevant to one or more key concepts. In another embodiment, the document listing may also include a search summary with snippets of text containing one or more search terms.

The search results may be provided to an external entity, which may include a user or another system. In one embodiment, the search results including the search summaries are provided to a user of a search engine through a graphical user interface. In another embodiment, the results are provided to another system through a system interface. An example user interface displaying search results is described below with regards to FIG. 6.

At block 112, process 100 ends.

Each of processes 100, 200, 300, and 400 depicts one particular sequence of events in accord with the present application. Other stages can be added, or the order of stages can be altered in these processes without departing from the scope of the present application.

Figure 5:
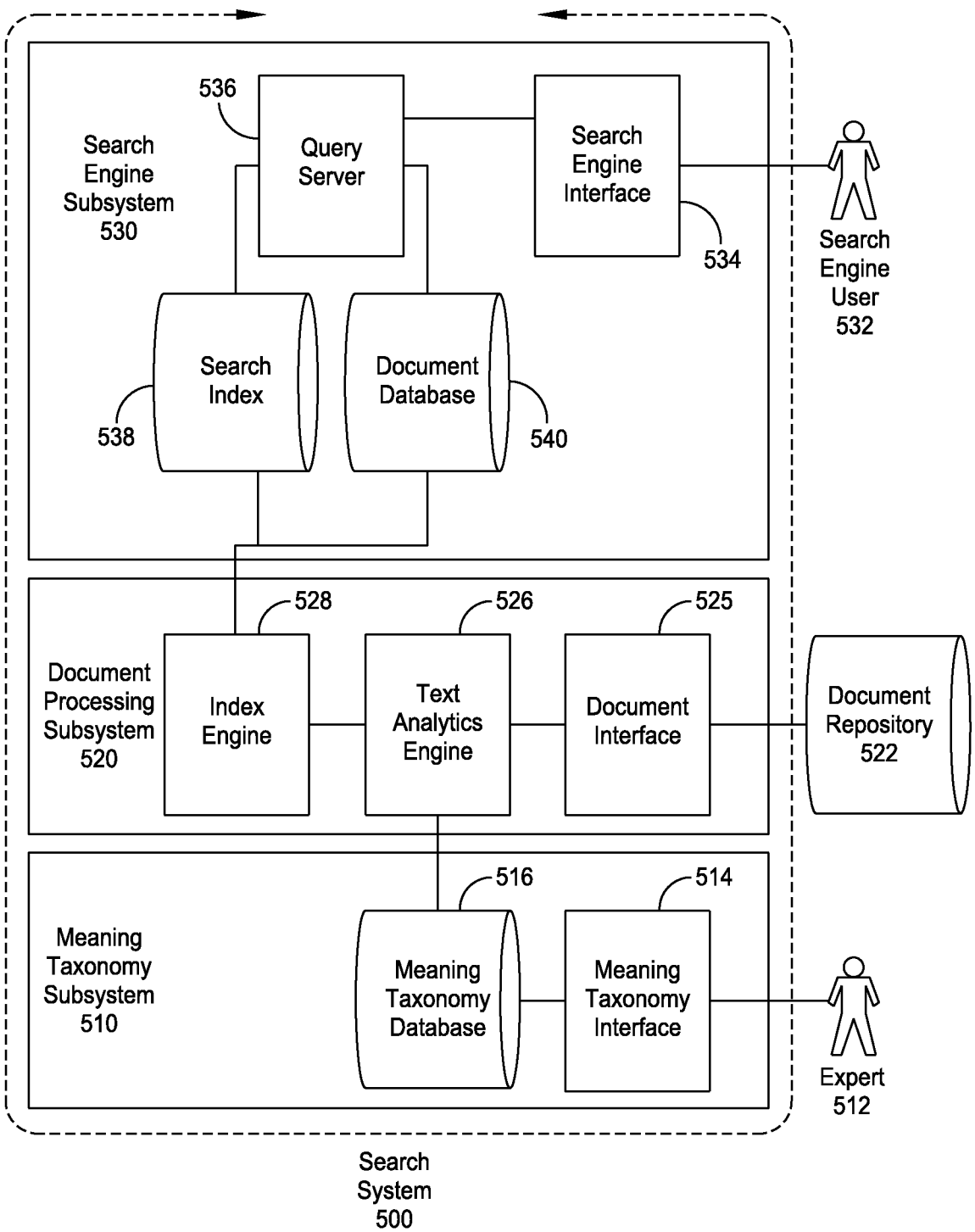
FIG. 5 depicts, in context, a system for providing a concept based search summary in accordance with one embodiment.

FIG. 5 illustrates a functional block diagram of a search summary system 500 according to one embodiment of the application. The search summary system 500 may be used to facilitate the processes detailed above. Any of the modules recited below may be implemented in customized software code or using existing software including a GUI, email, FTP, batch system interface, database system data movement tools, middleware, search engines such as Fast, Autonomy, Google Search Appliance, Microsoft SharePoint Search, and/or Lucene, scanning with optical character recognition (OCR), any combination thereof, or otherwise. Moreover, the modular structure and content recited below is for exemplary purposes only and is not intended to limit the application to the specific structure shown in FIG. 5. As will be apparent to one of ordinary skill in the art, many variant modular structures can be architected without deviating from the present application. The particular modular arrangement presented in FIG. 5 is depicted for illustrative purposes.

System 500 may include one or more subsystems. One of these subsystems may include a meaning taxonomy subsystem 510. The meaning taxonomy subsystem 510 may include a meaning taxonomy interface 514 and a meaning taxonomy database 516. The meaning taxonomy interface 514 may receive meaning taxonomy configuration information from, and display meaning taxonomy configuration information to, a domain expert 512. For example, the meaning taxonomy interface 514 may allow the domain expert 512 to enter or select rules by which non-normalized terms may be associated with normalized terms. The meaning taxonomy database 516 receives, stores, retrieves and provides meaning taxonomy configuration information, including information provided through interface 600 (shown in FIG. 6). In one embodiment, this information is stored in one or more relational or non-relational database tables or structures, such as documents. These tables or structures may include storage fields for non-normalized terms and normalized terms, as well as storage fields for the association of these components in the meaning taxonomy.

In some embodiments, the domain expert 512 may enter meaning taxonomy configuration information into a spreadsheet file, including Microsoft Excel format, comma-delimited format, or flat file. The meaning taxonomy interface 514 may be configured to process such a spreadsheet to extract the meaning taxonomy configuration information stored therein. Meaning taxonomy configuration information received via the meaning taxonomy interface 514 may be stored in the meaning taxonomy database 516.

System 500 may also include a document processing subsystem 520 configured to receive documents from a document repository 522. The document repository 522 may be a database configured to store documents, or may be one or more systems (e.g., web servers) accessible over a global network (such as the Internet) and offering documents available for download. The document processing subsystem 520 may include a text analytics engine 526 configured to locate key concepts in a document based on the presence of non-normalized terms, as discussed in detail herein.

The document processing subsystem 520 may further include an index engine 528 configured to extract information from a document that will be required to determine if the document satisfies a future search query. For example, the location of each key concept, word, and phrase in the document may be indexed by the index engine 528 and stored in a search index 538 associated with the search engine. The index engine 528 may also access metadata stored or derived from the document, including bibliographic metadata such as the author, title, publisher, date created, date modified, date published, document type, or other metadata, and may store such metadata in the search index 538.

In a preferred embodiment, the search index 538 and/or the document database 540 are located within the same subsystem as the query server 536 for speedy retrieval, as shown in FIG. 5. It will be appreciated, however, that storage space and other considerations may make it more feasible for the search index 538 and/or the document database 540 to be stored within the document processing subsystem 520 or otherwise separate from, but accessible by, the query server 536. Such variation are within the scope of this disclosure and do not depart from the spirit of the invention.

System 500 may also include a search engine subsystem 530. The search engine subsystem 530 may include a search engine interface 534 through which a search engine user 532 may create and submit a search query to a query server 536. The search engine interface 534 may receive search criteria, including normalized terms and/or key concepts, search terms, a proximity between normalized terms and/or search terms, and the like from the search engine user 532. In response, the query server 536 generates and returns results, including concept-based search summaries, to the search engine interface 534 for display to the search engine user 532.

The query server 536 receives search criteria from the search engine interface 534, and in response may access the search index 538 and the document database 540 in formulating a response, including a concept-based search summary. For example, the query server 536 may access the search index 538 to identify documents containing the search terms or key terms provided by the search engine user 532 to the search engine interface 534. Storing the association thusly in the search index 538 may yield performance benefits when retrieving documents according to their relationship to the meaning taxonomy.

The query server 536 may access information stored in the search index 538 regarding the location of search terms or key terms in the document, and may use that location information to extract portions of the document from the document database 540. Those portions of the document may be used to create a concept-based search summary for the document, which may comprise a passage of the document relevant to the search terms or key terms. The concept-based search summary may also incorporate metadata about the document, including the title, publisher, author, publication date, links to online versions of the document, and the like. The concept-based search summary may then be provided to the search engine user 532 via the search engine interface 534.

The document database 540 may store a portion or the entirety of documents in one or more relational database tables or other structures. These tables may share common keys with the database tables in search index 538. These tables may include storage fields for sections of documents (including text, images, etc.) and metadata including association information associating sections of documents with one or more normalized terms. In another embodiment, the document database 540 and the search index 538 may be combined into one database including document information and extracted section information.

Information may flow between these components and subsystems using any technique known in the art. Such techniques include passing the information over the network via TCP/IP, passing the information between modules in memory and passing the information by writing to a file, database, or some other non-volatile storage device.

The databases 516, 522, 538, and 540 may take the form of any logical and physical construction capable of storing information on a computer readable medium including flat files, indexed files, hierarchical databases, relational databases and/or object oriented databases. The data may be modeled using unique and foreign key relationships and indexes. The unique and foreign key relationships and indexes may be established between the various fields and tables to ensure both data integrity and retrieval speed.

The meaning taxonomy interface 514 (including via term interface 600) and the search engine interface 534 each exchange information with various system interfaces and users. In the exemplary embodiment illustrated in FIG. 5, the information domain expert 512 exchanges information with the meaning taxonomy interface 514. Similarly, the search engine user 532 exchanges information with the search engine interface 534. In an alternative embodiment, this information may be exchanged with other applications or storage media using system interfaces provided by each of these components. Each of these components may allow for free text input, or may restrict input to a predefined set of values, and may validate any information entered prior to using the information or providing the information to other components.

The search engine interface 534 provides interfaces that receive search criteria from a search engine user 532. In one embodiment, the search engine user 528 enters search engine criteria into a graphical user interface. The search engine criteria may include key terms, normalized terms, search terms, a proximity requirement, a language, a part of speech (e.g., if a key term is an adjective or a verb), a source location (e.g., a physical location like a city or document databases that searched documents are received from), relationship operators, wildcards, masks, sentence structures, sentence types (e.g., a question, an exclamatory sentence, etc.), paragraph structures, and other substantive, syntactic, or grammatical criteria.

Using the search criteria provided by the search engine interface 534 and information stored in the document database 540 and the search index 538, the query server 536 identifies documents responsive to the search criteria. The query server 536 may then send search result information including the relevant documents, relevant document metadata, and the extracted sections to the search engine interface 534.

In some examples, the query server 536 may sort the search result information based on content relevancy. For example, the query server 536 may sort search result information based on how many search terms, concepts, or non-normalized terms associated with concepts, are present. In other examples, the query server 536 may receive sorting criteria, and accordingly sort the displayed search results according to the criteria. For example, the query server 536 may receive a request to sort the search results by author name, document name, document length, etc. In other examples, the query server 536 may sort search results based on a weighted level of interest, as described above. Further, the query server 536 may sort extracted sections of a document based on the distance between a concept and a search term or another concept. The query server 536, referring to information stored in the search index 538, may then send the search result information including the sorted documents and associated sorted summaries to the search engine interface 534 to be displayed.

According to one implementation, after receiving the search result information, the search engine interface 534 may display the search result information to the search engine user 532. The search engine interface may display each document name with a link to the document, document information, sections of the document relating to received key terms, and identified sections of the document related to the received meaning loaded entities.

According to another implementation, the search engine interface 534 may display document sections including both key terms and meaning loaded entities (e.g., based on the sorted search summaries) before document sections including only a key term or meaning loaded entity. According to some aspects, the search summary may include a limited number of displayed sections of a document (e.g., three) with an additional input to display more.

Additionally, the search engine interface 534 may receive input to filter the document search summaries to, for example, only display sections relating to concepts or only display sections relating to both a concept or a search term. For example, if the search summary system receives key terms "Microsoft, 2015" and concept "Strategic Partnerships," the search summary system may receive input requesting that the query server 536 only return results with search summaries that include the term "Microsoft" with a specified proximity to the "Strategic Partnership" concept. The term "2015" may be used to determine that a document is published in 2015 or includes information from 2015, but the user may not be interested in summaries that include the term 2015 with Strategic Partnerships. In this example, the search summary system may filter out documents that do not include the term 2015 and still display search results including Microsoft and non-normalized terms associated with Strategic Partnerships.

The search engine interface 534 may also receive input to filter documents by date, author, etc. In some embodiments, the non-normalized terms associated with a concept may be visible to a user, who may have the option to filter certain non-normalized terms out of a search results.

Figure 6:
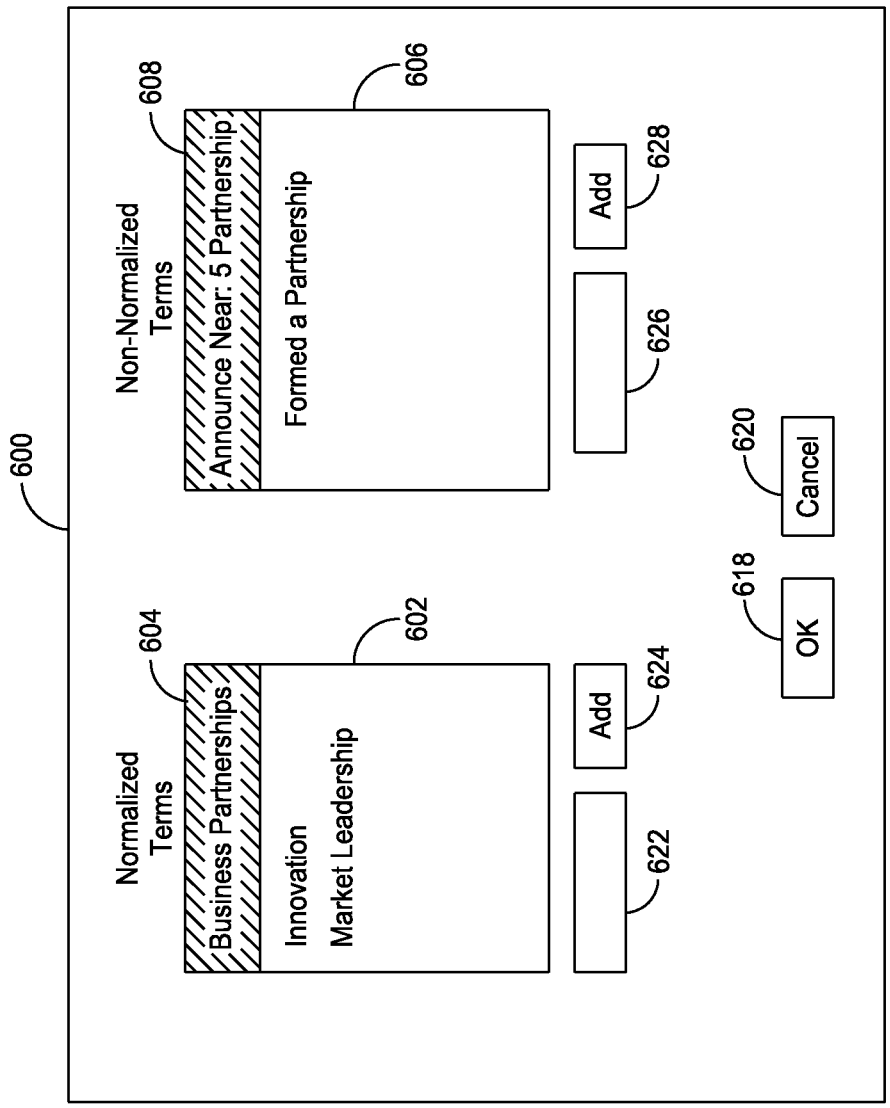
FIG. 6 is an example user interface according to one embodiment that may be presented to a user and/or a developer by an expert search engine system to allow the user to define a meaning taxonomy.

FIG. 6 depicts one exemplary embodiment in which the information domain expert 512 may enter normalized terms and non-normalized terms using a term interface 600 of meaning taxonomy interface 514. In particular, FIG. 6 illustrates a term configuration screen 600 that may include normalized term list 602, currently selected normalized term 604, non-normalized term list 606, currently selected non-normalized term 608, an OK button 618 and a Cancel button 620.

These user interface elements of the term configuration screen 700 may function as follows. With combined reference to FIGS. 5 and 6, the information domain expert 512 may enter new normalized terms by selecting a currently selected normalized term 604 in the normalized term list 602 and entering new list entries using normalized term entry element 622. Each new term may be stored after it is entered by clicking the Add button 624. Similarly, the information domain expert 512 may enter new non-normalized terms by selecting the non-normalized term list 604 and entering new list entries using non-normalized term entry element 626. Each new term may be stored after it is entered by clicking the Add button 628.

To select a particular normalized term with which to associate one or more non-normalized terms, the information domain expert 512 may select the particular normalized term, making it the currently selected normalized term 604 in the normalized term list 602. The non-normalized terms associated with the currently-selected normalized term 604 may then be displayed in the non-normalized term list 604. The information domain expert 512 may enter new non-normalized terms to associate with the currently selected normalized term 604 by entering new list entries using non-normalized term entry element 626. Each new term may be stored after it is entered by clicking the Add button 628. Similarly, the information domain expert 502 may be given the option to disassociate a previously-entered non-normalized term from the currently selected normalized term 604.

When the information domain expert 512 is done using the term interface 600, the OK button 614 may be clicked to save any unsaved changes made, or the Cancel button 620 may be clicked to discard the unsaved changes.

Figure 7:
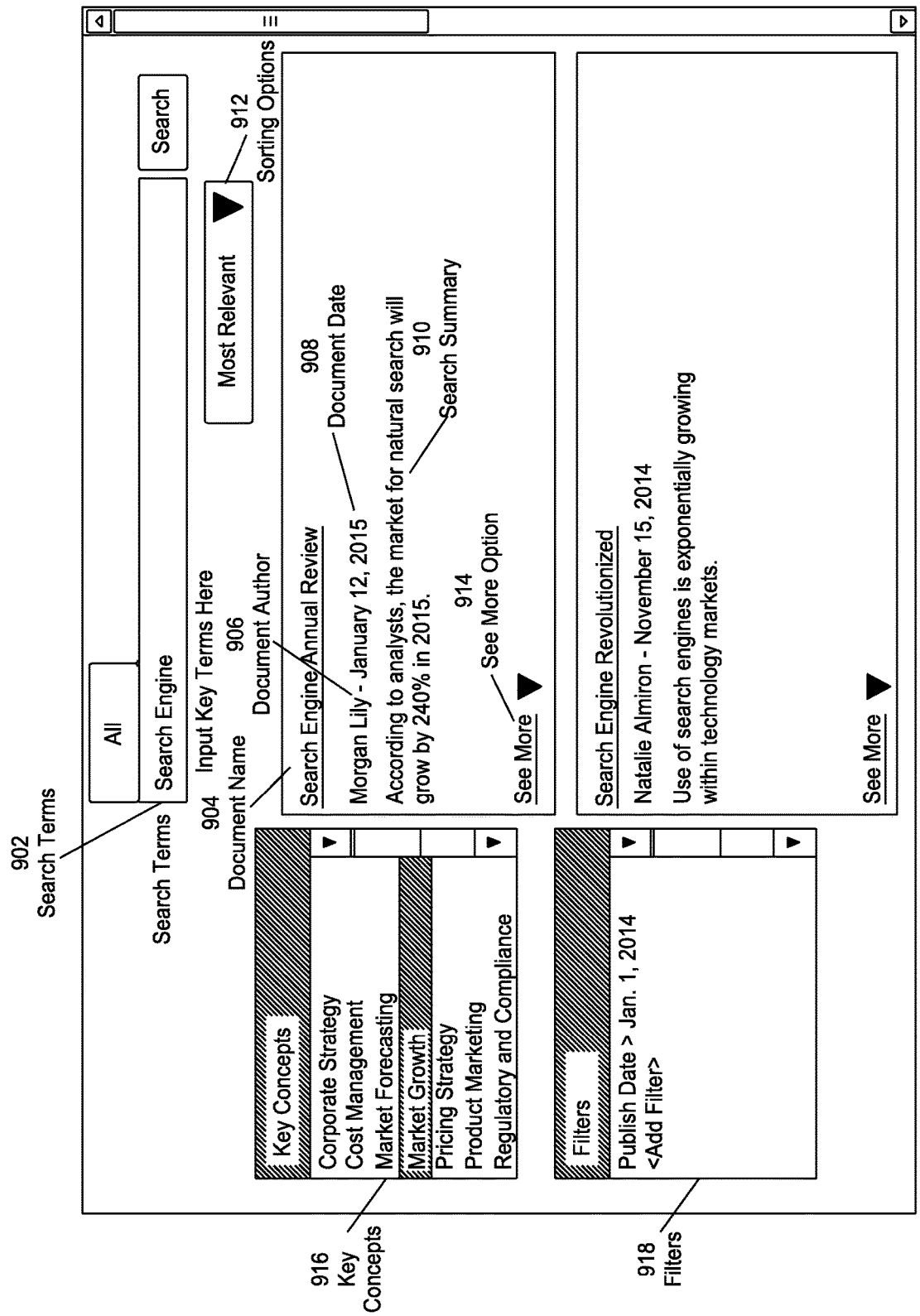
FIG. 7 is an example user interface according to one embodiment that may be presented to a user by a search summary system to allow the user to input a search and receive search results including concept-based search summaries.

FIG. 7 illustrates an example user interface for displaying concept-based search summaries according to one embodiment. In the illustrated example, the user interface includes elements for search terms 702, concepts 716, and filters 718. Using the received elements, the user interface may display document names 704 along with document authors 706, document dates 708, and search summaries 710. The document information may be taken from metadata describing the document, and the search summaries 710 may have been generated from the document by locating non-normalized terms associated with one or more normalized terms 716 (i.e., concepts). The search summaries 710 may include search terms 702 and/or non-normalized terms associated with key concepts. In some embodiments, all of the relevant parts of text may be extracted and displayed in the user interface. In one embodiment, the search summary may be clickable and include a link to the section of the document including the search summary, allowing the user to directly go to a relevant section of the document. In the example illustrated in FIG. 7, a See More option 714 is displayed that, when activated, may show additional search summaries 710. Further, the documents may be sorted by how many relevant search summaries 710 relate to the document. In the illustrated example, the "Search Engine Annual Review" document may include more relevant search summary sections than the "Search Engines Revolutionized" document. The sorting options 712 may also allow a user to sort documents by document name 704, document author 706, document date 708, etc.

The search summaries 710 may be any specified length (e.g., fifty characters, one sentence, one paragraph, etc.) and may include any number of displayed sections of text or other media. In some embodiments, if metadata describes an image relating to a search term 702 and/or a concept that image or a representation of that image may be displayed in the search summary.

Filters may also be added to limit the documents that are displayed. In the illustrated example on FIG. 7, a filter is included that requires the documents displayed have a publishing date after Jan. 1, 2014. Filters may specify words (e.g., if a user wishes to exclude documents with certain terms), authors, publishers, dates, locations, titles, document metadata tags, etc.

In some embodiments, the search terms 702 may include categorized search terms. For example, instead of loading filters and concepts, a user may input "MLE='Strategic Partnerships', CBS News, IBM" to search for documents including the concept "Strategic Partnerships" as well as "CBS News" and "IBM" as key terms. Documents with search summaries including, for example, "CBS News and IBM are working together to fund new startups" may be displayed in response to this example search.

Figure 8:
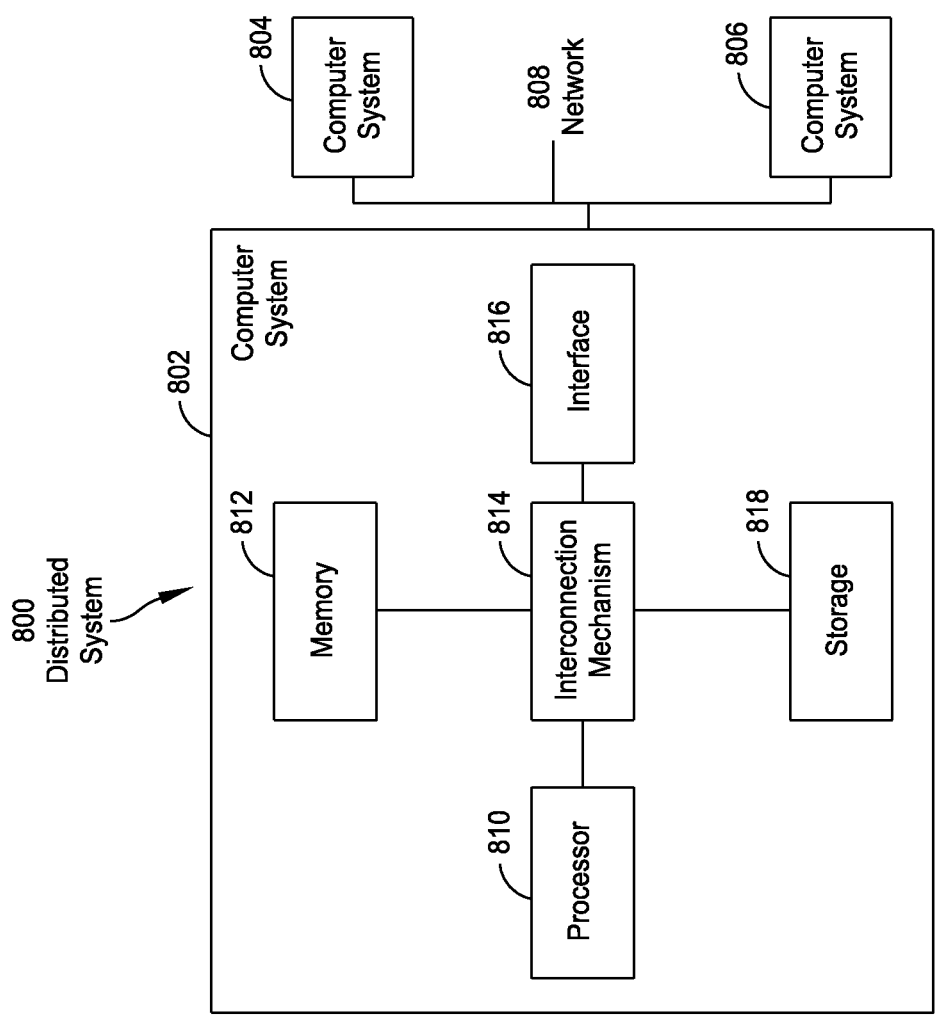
FIG. 8 shows a computer system upon which various embodiments may be practiced.

Various aspects, functions, and processes may be distributed among one or more computer systems configured to provide a service to one or more client computers, or to perform an overall task as part of a distributed system, such as the distributed computer system 800 shown in FIG. 8. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Referring to FIG. 8, there is illustrated a block diagram of a distributed computer system 1000, in which various aspects and functions are practiced. As shown, the distributed computer system 1000 includes one or more computer systems that exchange information. More specifically, the distributed computer system 800 includes computer systems 802, 804, and 806. As shown, the computer systems 802, 804, and 806 are interconnected by, and may exchange data through, a communication network 808. The network 808 may include any communication network through which computer systems may exchange data. To exchange data using the network 808, the computer systems 802, 804, and 806 and the network 808 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 802, 804, and 806 may transmit data via the network 808 using a variety of security measures including, for example, SSL or VPN technologies. While the distributed computer system 1000 illustrates three networked computer systems, the distributed computer system 1000 is not so limited and may include any number of computer systems and computing devices, networked using any medium and communication protocol.

As illustrated in FIG. 8, the computer system 802 includes a processor 810, a memory 812, an interconnection element 814, an interface 816 and data storage element 818. To implement at least some of the aspects, functions, and processes disclosed herein, the processor 810 performs a series of instructions that result in manipulated data. The processor 810 may be any type of processor, multiprocessor or controller. Example processors may include a commercially available processor such as an Intel Xeon, Itanium, or Coreprocessor; an AMD Opteron processor; an Apple A4 or A5 processor; an IBM Power5+ processor; an IBM mainframe chip; or a quantum computer. Any number of processor and types of processors may be used. The processor 810 is connected to other system components, including one or more memory devices 812, by the interconnection element 814.

The memory 812 stores programs (e.g., sequences of instructions coded to be executable by the processor 810) and data during operation of the computer system 802. Thus, the memory 812 may be a relatively high performance, volatile, random access memory such as a dynamic random access memory ("DRAM") or static memory ("SRAM"). However, the memory 812 may include any device for storing data, such as a disk drive or other nonvolatile storage device. Various examples may organize the memory 812 into particularized and, in some cases, unique structures to perform the functions disclosed herein. These data structures may be sized and organized to store values for particular data and types of data.

Components of the computer system 802 are coupled by an interconnection element such as the interconnection element 814. The interconnection element 814 may include any communication coupling between system components such as one or more physical busses in conformance with specialized or standard computing bus technologies such as IDE, SCSI, PCI and InfiniBand. The interconnection element 814 enables communications, including instructions and data, to be exchanged between system components of the computer system 802.

The computer system 802 also includes one or more interface devices 816 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 802 to exchange information and to communicate with external entities, such as users and other systems.

The data storage element 818 includes a computer readable and writeable nonvolatile, or non-transitory, data storage medium in which instructions are stored that define a program or other object that is executed by the processor 810. The data storage element 818 also may include information that is recorded, on or in, the medium, and that is processed by the processor 810 during execution of the program. More specifically, the information may be stored in one or more data structures specifically configured to conserve storage space or increase data exchange performance. The instructions may be persistently stored as encoded signals, and the instructions may cause the processor 810 to perform any of the functions described herein. The medium may, for example, be optical disk, magnetic disk or flash memory, among others. In operation, the processor 810 or some other controller causes data to be read from the nonvolatile recording medium into another memory, such as the memory 812, that allows for faster access to the information by the processor 810 than does the storage medium included in the data storage element 818. The memory may be located in the data storage element 818 or in the memory 812, however, the processor 810 manipulates the data within the memory, and then copies the data to the storage medium associated with the data storage element 818 after processing is completed. A variety of components may manage data movement between the storage medium and other memory elements and examples are not limited to particular data management components. Further, examples are not limited to a particular memory system or data storage system.

Although the computer system 802 is shown by way of example as one type of computer system upon which various aspects and functions may be practiced, aspects and functions are not limited to being implemented on the computer system 802 as shown in FIG. 5. Various aspects and functions may be practiced on one or more computers having a different architectures or components than that shown in FIG. 5. For instance, the computer system 802 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 802 may be a computer system including an operating system that manages at least a portion of the hardware elements included in the computer system 802. In some examples, a processor or controller, such as the processor 810, executes an operating system. Examples of a particular operating system that may be executed include a Windows-based operating system, such as, Windows 7 or 8 operating systems, available from the Microsoft Corporation, a MAC OS System X operating system or an iOS operating system available from Apple Computer, one of many Linux-based operating system distributions, for example, the Enterprise Linux operating system available from Red Hat Inc., or a UNIX operating systems available from various sources. Many other operating systems may be used, and examples are not limited to any particular operating system.

The processor 810 and operating system together define a computer platform for which application programs in high-level programming languages are written. These component applications may be executable, intermediate, bytecode or interpreted code which communicates over a communication network, for example, the Internet, using a communication protocol, for example, TCP/IP Similarly, aspects may be implemented using an object-oriented programming language, such as .Net, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Based on the foregoing disclosure, it should be apparent to one of ordinary skill in the art that the application is not limited to a particular computer system platform, processor, operating system, network, or communication protocol. Also, it should be apparent that the present application is not limited to a specific architecture or programming language.

Having now described some illustrative aspects of the application, it should be apparent to those skilled in the art that the foregoing is merely illustrative and not limiting, having been presented by way of example only. While the bulk of this disclosure is focused on embodiments directed to data types relating to business management, aspects of the present application may be applied to other information domains, for instance law and scientific disciplines. Similarly, aspects of the present application may be used to achieve other objectives including assisting other types of users, such as domain information experts, in their analysis of specific information domains. Numerous modifications and other illustrative embodiments are within the scope of one of ordinary skill in the art and are contemplated as falling within the scope of the application. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

What is claimed is:

1. A system for generating concept-based search summaries from a plurality of documents, the system comprising:
   a first graphical user interface configured to receive information identifying a meaning taxonomy including (a) one or more syntactic structures that associate non-normalized terms with a plurality of normalized terms and (b) at least one disambiguation term;
   a second graphical user interface configured to receive a search query including at least one search term and at least one normalized term of the plurality of normalized terms;
   a memory having storage capacity; and
   at least one processor coupled to the memory and the first and second graphical user interfaces and configured to:
      identify a first document within the plurality of documents, the first document including the at least one search term and a first plurality of non-normalized terms corresponding to at least one syntactic structure associated with the at least one normalized term of the plurality of normalized terms and satisfying at least one condition relating to a presence or an absence of the at least one disambiguation term;
      determine a first numerical location of a first non-normalized term in the first plurality of non-normalized terms in the first document;
      determine a second numerical location of a second non-normalized term in the first plurality of non-normalized terms in the first document;
      determine a first numerical distance between the first numerical location and the second numerical location;
      identify a second document within the plurality of documents, the second document including the at least one search term and a second plurality of non-normalized terms corresponding to at least one syntactic structure associated with the at least one normalized term of the plurality of normalized terms and satisfying the at least one condition relating to the presence or the absence of the at least one disambiguation term;
      determine a third numerical location of a third non-normalized term in the second plurality of non-normalized terms in the second document;

determine a fourth numerical location of a fourth non-normalized term in the second plurality of non-normalized terms in the second document;
determine a second numerical distance between the third numerical location and the fourth numerical location;
determine a third numerical distance between two normalized terms of the plurality of normalized terms in the first document;
determine a fourth numerical distance between two normalized terms of the plurality of normalized terms in the second document;
present a plurality of search results comprising at least a first summary of the first document and a second summary of the second document, wherein the plurality of search results are sorted relative to each other based at least on the first numerical distance and the second numerical distance, a smaller numerical distance being associated with a higher search ranking; and
present an extracted portion of the first document and an extracted portion of the second document, sorted based on the third numerical distance and the fourth numerical distance.

2. The system according to claim 1, wherein each of the one or more syntactic structures comprises one or more words.

3. The system according to claim 1, wherein the first graphical user interface is further configured to receive a proximity requirement between the at least one search term and the at least one syntactic structure, and wherein the at least one processor is configured to filter the plurality of summaries to summaries that fulfill the proximity requirement.

4. The system according to claim 1, wherein the at least one processor is further configured to sort the plurality of search results by a number of occurrences of the one or more syntactic structures.

5. The system according to claim 1, wherein the first summary includes at least one text string from the first document including the at least one search term and the at least one syntactic structure.

6. The system according to claim 1, wherein the at least one normalized term includes two or more normalized terms and wherein the first summary includes a plurality of syntactic structures associated with the two or more normalized terms.

7. The system according to claim 1, wherein the at least one processor is further configured to:
determine, as a requisite for including the first document in the plurality of search results, that the first plurality of non-normalized terms satisfies a proximity requirement between a first non-normalized term in the first plurality of non-normalized terms and a second non-normalized term in the first plurality of non-normalized terms; and
filter out at least one document in the plurality of documents that does not satisfy the proximity requirement.

8. A computer-implemented method for generating concept-based search summaries from a plurality of documents, the method comprising:
receiving information identifying a meaning taxonomy including a plurality of meaning loaded entities and at least one disambiguation term, each meaning loaded entity of the plurality of meaning loaded entities being associated with one or more syntactic structures that associate non-normalized terms with a plurality of normalized terms;
receiving a search query including at least one search term and identifying at least one meaning loaded entity of the plurality of meaning loaded entities;
identifying a first document within the plurality of documents, the first document including the at least one search term and a first plurality of non-normalized terms corresponding to at least one syntactic structure associated with the at least one meaning loaded entity of the plurality of meaning loaded entities and satisfying at least one condition relating to a presence or an absence of the at least one disambiguation term;
determining a first numerical location of a first non-normalized term in the first plurality of non-normalized terms in the first document;
determining a second numerical location of a second non-normalized term in the first plurality of non-normalized terms in the first document;
determining a first numerical distance between the first numerical location and the second numerical location;
identifying a second document within the plurality of documents, the second document including the at least one search term and a second plurality of non-normalized terms corresponding to at least one syntactic structure associated with the at least one meaning loaded entity of the plurality of meaning loaded entities and satisfying the at least one condition relating to the presence or the absence of the at least one disambiguation term;
determining a third numerical location of a third non-normalized term in the second plurality of non-normalized terms in the second document;
determining a fourth numerical location of a fourth non-normalized term in the second plurality of non-normalized terms in the second document;
determining a second numerical distance between the third numerical location and the fourth numerical location;
determining a third numerical distance between two normalized terms of the plurality of normalized terms in an extracted portion of the first document;
determining a fourth numerical distance between two normalized terms of the plurality of normalized terms in an extracted portion of the second document; and
presenting a plurality of search results comprising at least a first summary of the first document and a second summary of the second document, wherein the plurality of search results are sorted relative to each other based at least on the first numerical distance and the second numerical distance, a smaller numerical distance being associated with a higher search ranking, and
presenting the extracted portion of the first document and the extracted portion of the second document, sorted based on the third numerical distance and the fourth numerical distance.

9. The method according to claim 8, wherein receiving information identifying the meaning taxonomy comprises receiving information identifying at least one expert rule set.

10. The method according to claim 8, further comprising:
receiving information identifying a proximity requirement between the at least one search term and the at least one syntactic structure; and
filtering the plurality of search results to documents that fulfill the proximity requirement.

11. The method according to claim 8, further comprising sorting the plurality of search results by a number of instances that each respective search result includes the one or more syntactic structures.

12. The method according to claim 8, further comprising sorting the plurality of search results by a date associated with each respective search result in the plurality of search results.

13. The method according to claim 8, wherein displaying the first summary includes displaying at least one text string from the first document including the at least one search term and the at least one syntactic structure.

14. The method according to claim 8, wherein receiving the search query identifying the at least one normalized term includes receiving the search query identifying two or more normalized terms and wherein displaying the first summary includes displaying a plurality of syntactic structures associated with the two or more meaning loaded entities.

15. The method according to claim 8, further comprising receiving information identifying a syntactic structure associated with the at least one normalized term and filtering out documents that include the syntactic structure.

16. The method according to claim 8, further comprising:
determining, as a requisite for including the first document in the plurality of search results, that the first plurality of non-normalized terms satisfies a proximity requirement between a first non-normalized term in the first plurality of non-normalized terms and a second non-normalized term in the first plurality of non-normalized terms; and
filtering out at least one document in the plurality of documents that does not satisfy the proximity requirement.

17. One or more non-transitory computer readable media having stored thereon sequences of instruction, the sequences of instruction including executable instructions that instruct at least one processor to:
receive information identifying a meaning taxonomy including (a) one or more syntactic structures that associate non-normalized terms with a plurality of normalized terms and (b) at least one disambiguation term;
receive a search query including at least one search term and at least one normalized term of the plurality of normalized terms;
identify a first document within the plurality of documents, the first document including the at least one search term and a first plurality of non-normalized terms corresponding to at least one syntactic structure associated with the at least one normalized term of the plurality of normalized terms and satisfying at least one condition relating to a presence or an absence of the at least one disambiguation term;
determine a first numerical location of a first non-normalized term in the first plurality of non-normalized terms in the first document;
determine a second numerical location of a second non-normalized term in the first plurality of non-normalized terms in the first document;
determine a first numerical distance between the first numerical location and the second numerical location;
identify a second document within the plurality of documents, the second document including the at least one search term and a second plurality of non-normalized terms corresponding to at least one syntactic structure associated with the at least one normalized term of the plurality of normalized terms and satisfying the at least one condition relating to the presence or the absence of the at least one disambiguation term;
determine a third numerical location of a third non-normalized term in the second plurality of non-normalized terms in the second document;
determine a fourth numerical location of a fourth non-normalized term in the second plurality of non-normalized terms in the second document;
determine a second numerical distance between the third numerical location and the fourth numerical location;
determine a third numerical distance between two normalized terms of the plurality of normalized terms in an extracted portion of the first document;
determine a fourth numerical distance between two normalized terms of the plurality of normalized terms in an extracted portion of the second document; and
present a plurality of search results comprising at least a first summary of the first document and a second summary of the second document, wherein the plurality of search results are sorted relative to each other based at least on the first numerical distance and the second numerical distance, a smaller numerical distance being associated with a higher search ranking; and
present the extracted portion of the first document and the extracted portion of the second document, sorted based on the third numerical distance and the fourth numerical distance.

18. The one or more non-transitory computer readable media according to claim 17, wherein the sequences of instructions further comprise instructions that instruct the at least one processor to:
receive a proximity requirement between the at least one search term and the at least one syntactic structure; and
filter the plurality of summaries to summaries that fulfill the proximity requirement.

19. The one or more non-transitory computer-readable media of claim 17, wherein the sequences of instructions further comprise instructions that instruct the at least one processor to:
determine, as a requisite for including the first document in the plurality of search results, that the first plurality of non-normalized terms satisfies a proximity requirement between a first non-normalized term in the first plurality of non-normalized terms and a second non-normalized term in the first plurality of non-normalized terms; and
filter out at least one document in the plurality of documents that does not satisfy the proximity requirement.

20. The one or more non-transitory computer-readable media of claim 19, wherein the sequences of instructions further comprise instructions that instruct the at least one processor to:
receive an expert rule set, defined by an information domain expert, comprising the proximity requirement.

* * * * *